(12) United States Patent
Nagumo

(10) Patent No.: US 10,817,210 B2
(45) Date of Patent: Oct. 27, 2020

(54) INFORMATION PROCESSING APPARATUS, METHOD OF MANAGING WEB APPLICATION, AND NON-TRANSITORY COMPUTER-READABLE MEDIUM

(71) Applicant: Taku Nagumo, Kanagawa (JP)

(72) Inventor: Taku Nagumo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/588,204

(22) Filed: Sep. 30, 2019

(65) Prior Publication Data

US 2020/0026432 A1 Jan. 23, 2020

Related U.S. Application Data

(63) Continuation of application No. 15/611,932, filed on Jun. 2, 2017, now Pat. No. 10,452,307.

(30) Foreign Application Priority Data

Jun. 23, 2016 (JP) ................................. 2016-124550

(51) Int. Cl.
*G06F 9/44* (2018.01)
*G06F 3/06* (2006.01)
*G06Q 10/06* (2012.01)

(52) U.S. Cl.
CPC ............ *G06F 3/065* (2013.01); *G06F 3/0604* (2013.01); *G06F 3/0673* (2013.01); *G06Q 10/06* (2013.01)

(58) Field of Classification Search
None
See application file for complete search history.

(56) References Cited

U.S. PATENT DOCUMENTS

| 2005/0085222 A1* | 4/2005 | Przybilski | ................. G06F 8/65 455/418 |
| 2010/0114853 A1* | 5/2010 | Fisher | ................ H04N 21/4126 707/705 |
| 2013/0125102 A1 | 5/2013 | Kimura | |

(Continued)

FOREIGN PATENT DOCUMENTS

| JP | 2013105464 A | 5/2013 |
| JP | 2014-032659 | 2/2014 |

(Continued)

*Primary Examiner* — Qamrun Nahar
(74) *Attorney, Agent, or Firm* — Harness, Dickey and Pierce, P.L.C.

(57) ABSTRACT

An information processing apparatus for managing one or more web applications includes a memory and circuitry. The memory includes a first memory area and a second memory area. The first memory area stores one or more pieces of application initial data, each application initial data including a set of a web application and settings of the web application, and one or more packages of the application initial data. The second memory area is associated with an organization, and stores at least one of the packages that has been sold to the organization. The circuitry copies at least one package of the packages being sold to the organization from the first memory area to the second memory area to allow an electronic device of the organization to use the web application based on the package stored in second memory area.

18 Claims, 27 Drawing Sheets

(56) References Cited

U.S. PATENT DOCUMENTS

| | | | | |
|---|---|---|---|---|
| 2013/0132528 A1* | 5/2013 | Enomoto | ............. | G06F 21/121 |
| | | | | 709/219 |
| 2014/0016165 A1* | 1/2014 | Ando | .................. | H04N 1/4433 |
| | | | | 358/403 |
| 2015/0100955 A1* | 4/2015 | Chen | ...................... | G06F 8/658 |
| | | | | 717/170 |
| 2015/0207758 A1 | 7/2015 | Mordani et al. | | |

FOREIGN PATENT DOCUMENTS

| | | | |
|---|---|---|---|
| JP | 2015210769 A | 11/2015 | |
| JP | 2017532677 A | 11/2017 | |

* cited by examiner

FIG. 12

| APPLICATION INITIAL DATA SETTINGS |
|---|
| APPLICATION |
| Scan to Storage ▼ |
| NAME |
| Scan to Storage |
| STATUS |
| Public ▼ |
| ICON |
| [Select File]  FILE IS NOT SELECTED |
| EXPLANATION |
| Scan to Storage default data. |

FIG. 13

APPLICATION JOB SETTINGS

COMMON SETTINGS
JOB VALID TIME (SECONDS)

| 259200 |

I/O APPLICATION NAME

| std apps |

JOB EXECUTION I/O FLOW NAME

|  |

JOB EXECUTION I/O SYNCHRONIZATION CALL
☐
JOB EXECUTION OPERATION

| EXECUTE A REQUEST AND ALL ATTACHMENTS AS A SINGLE JOB ▼ |

JOB EXECUTION I/O REQUEST SIZE (bytes)

|  |

(−) PORT MONITOR SETTINGS
JOB EXECUTION I/O FLOW NAME

|  |

JOB EXECUTION I/O SYNCHRONIZATION CALL
☐
JOB EXECUTION I/O REQUEST SIZE (bytes)

|  |

(+) MAIL JOB SETTINGS
(−) SERVICE PROVIDER SETTINGS

| # | SERVICE PROVIDER | I/O APPLICATION NAME | JOB EXECUTION I/O FLOW | FOLDER ACQUISITION I/O FLOW | OPERATION |
|---|---|---|---|---|---|
| 1 | aaa | std apps | aaa-upload | aaa-list | delete |
| 2 | bbb | std apps | bbb-upload | bbb-list | delete |
|   |   |   |   |   | add |

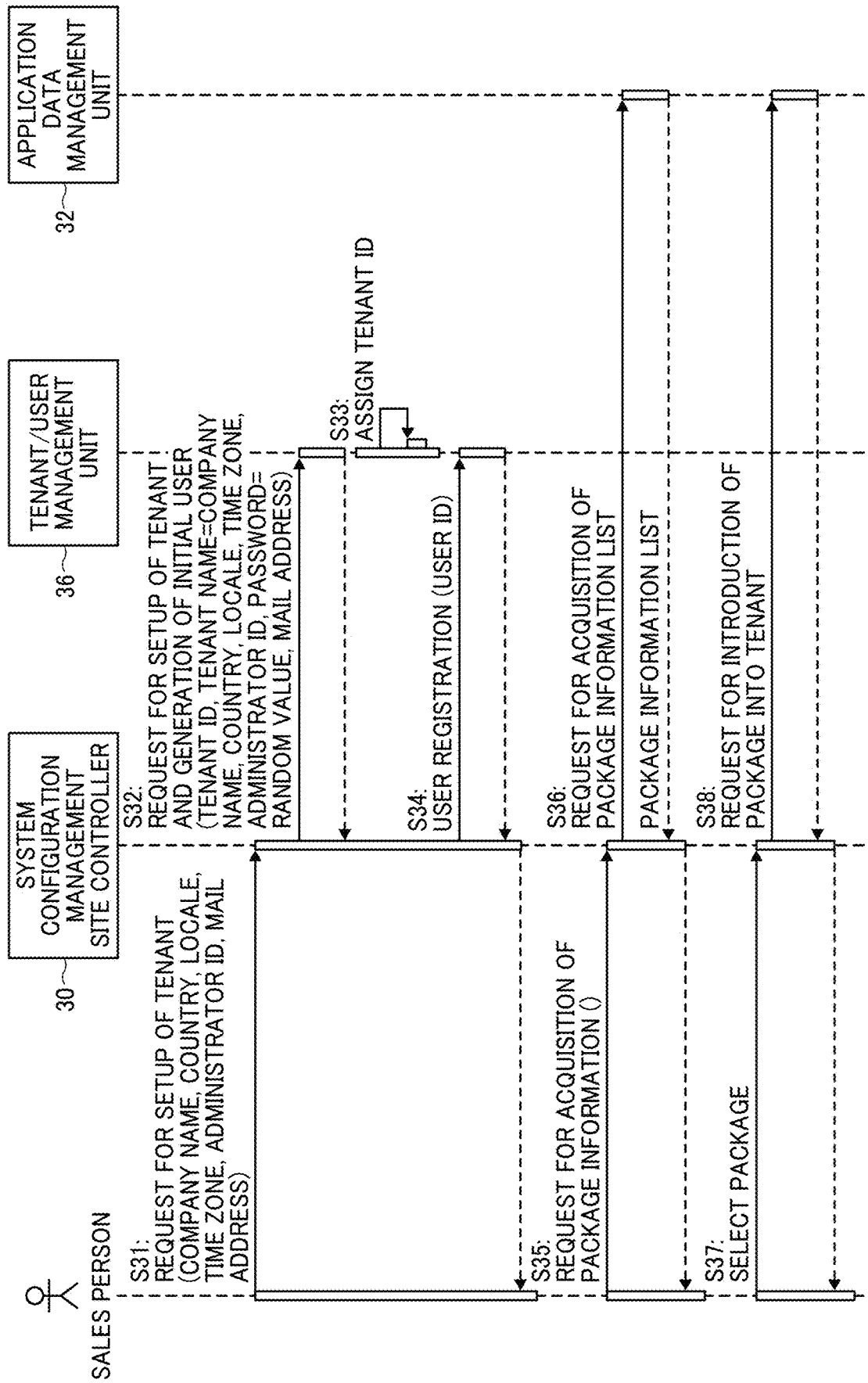

| Scan to Storage | |
|---|---|
| STORAGE SETTINGS | |
| STORAGE | [SELECT STORAGE...] aaa |
| COMMON SETTINGS | |
| INITIAL FOLDER ID | [SELECT FOLDER] (ROOT FOLDER) |
| INITIAL DISPLAY SCREEN | FOLDER HIERARCHY SCREEN ▼ |
| NOTIFICATION DESTINATION IN CASE OF ERROR | |
| MAIL SUBJECT | %FILENAME-xxx Cloud Services |
| MAIL TEXT | |
| COLOR MODE FOR SCAN | AUTOMATIC SELECTION OF COLOR ▼ |
| | ☐ PROHIBIT CHANGE OF COLOR MODE FOR SCAN |
| DOCUMENT SIDE TO BE SCANNED | 1-SIDED ▼ |
| | ☐ PROHIBIT CHANGE OF SIDE OF DOCUMENT TO BE SCANNED |
| DOCUMENT ORIENTATION | ORIENTATION IN WHICH TEXT IS READABLE ▼ |
| | ☐ PROHIBIT CHANGE OF DOCUMENT ORIENTATION |
| SCAN RESOLUTION | 300 ▼ |
| | ☐ PROHIBIT CHANGE OF SCAN RESOLUTION |
| DOCUMENT FORMAT | PDF ▼ |
| | ☐ PROHIBIT CHANGE OF DOCUMENT FORMAT |
| PREVIEW OF SCANNED DOCUMENT | ▼ |
| OCR | OFF ▼ |
| | ☐ PROHIBIT CHANGE OF OCR |
| FILE NAME SETTINGS | |
| FILE NAME SETTING EXPLANATION | FILE NAME SETTINGS |
| FILE NAME INITIAL VALUE | |
| FILE NAME SEGMENTATION CHARACTER | |
| FILE NAME DATE LABEL | FILE NAME DATE LABEL |

```
{
  "scanColor": [
    {
      "title": "AUTOMATIC SELECTION OF COLOR",
      "value": "auto_color"
    },
    {
      "title": "MONOCHROME (BINARY) TEXT",
      "value": "monochrome_text"
    },
  ],
  "originalSide": [
    {
      "title": "1-SIDED",
      "value": "one_sided"
    },
    {
      "title": "TOP-TO-TOP",
      "value": "top_to_top"
    },
  ],
  "originalOrientation": [
    {
      "title": "READABLE ORIENTATION",
      "value": "readable"
```

FIG. 20B

```
    },
    {
      "title": "UNREADABLE ORIENTATION",
      "value": "unreadable"
    }
  ]
},
"scanResolution": [
  {
    "title": "100dpi",
    "value": "100"
  },
  {
    "title": "200dpi",
    "value": "200"
  }
],
"fileFormat": [
  {
    "title": "TIFF OR JPEG",
    "value": "tiff_jpeg"
  },
  {
    "title": "PDF",
    "value": "pdf"
  }
],
"originalPreview": [
  {
    "title": "PREVIEW DOCUMENT",
    "value": "true"
  }
```

FIG. 20C

```
},
{
  "title": "DO NOT PREVIEW DOCUMENT",
  "value": "false"
}
], "ocr": [
{
  "title": "DUTCH",
  "value": "Dutch"
},
{
  "title": "ENGLISH",
  "value": "English"
},
]
]
```

FIG. 21

| APPLICATION INITIAL DATA SETTINGS |
|---|
| APPLICATION |
| Job Print ▼ |
| NAME |
| Job Print(JP) |
| STATUS |
| Public ▼ |
| ICON |
| Select File   FILE IS NOT SELECTED |
| EXPLANATION |
| Job Print(JP)Default data. |

FIG. 22

APPLICATION JOB SETTINGS

COMMON SETTINGS
JOB VALID TIME (SECONDS)

| 259200 |

I/O APPLICATION NAME

| std apps |

JOB EXECUTION I/O FLOW NAME

| convert-JP |

JOB EXECUTION I/O SYNCHRONIZATION CALL
☐

JOB EXECUTION OPERATION

| EXECUTE ONE ATTACHMENT AS A JOB ▼ |

JOB EXECUTION I/O REQUEST SIZE (bytes)

| 41943040 |

(−) PORT MONITOR SETTINGS
JOB EXECUTION I/O FLOW NAME

| upload-from-portmonitor |

JOB EXECUTION I/O SYNCHRONIZATION CALL
☐

JOB EXECUTION I/O REQUEST SIZE (bytes)

| 314572800 |

(−) MAIL JOB SETTINGS
MAIL JOB EXECUTION OPERATION

| EXECUTE EACH OF TEXT AND ATTACHMENT AS DIFFERENT JOBS ▼ |

TEXT & ATTACHMENT JOB EXECUTION I/O FLOW NAME

|  |

TEXT PROCESSING JOB EXECUTION I/O FLOW NAME

| convert-JP |

ATTACHED-FILE PROCESSING EXECUTION I/O FLOW NAME

| convert-JP |

JOB PRINT

- DOCUMENT LIST
- UPLOAD FILE
- PRINT SETTINGS
- DOCUMENT MANAGEMENT SETTINGS
- PORT MONITOR SETTINGS

PRINT SETTINGS

MAIL ADDRESS DEDICATED TO TRANSMISSION OF PRINTED DOCUMENT

MAIL ADDRESS: 101006@ckaisi1.dev.sicos.xxx.com

PRINT SETTINGS

| Option | Value |
|---|---|
| NUMBER OF COPIES | 1 |
| 1-SIDED/2-SIDED | 1-SIDED ▸ |
| MULTIPLE PAGES PER SHEET | NO ▸ |
| PAPER SIZE | A4 ▸ |
| COLOR/MONOCHROME | MONOCHROME ▸ |
| TEXT PRINT | NO ▸ |

[OPEN DETAILED OPTIONS]

[SETTINGS]

INFORMATION PROCESSING APPARATUS, METHOD OF MANAGING WEB APPLICATION, AND NON-TRANSITORY COMPUTER-READABLE MEDIUM

CROSS-REFERENCE TO RELATED APPLICATIONS

This patent application a continuation application of U.S. application Ser. No. 15/611,932, filed on Jun. 2, 2017, which is based on and claims priority pursuant to 35 U.S.C. § 119(a) to Japanese Patent Application No. 2016-124550, filed on Jun. 23, 2016 in the Japan Patent Office, the entire disclosure of each of which is hereby incorporated by reference herein.

BACKGROUND

Technical Field

The present disclosure relates to an information processing apparatus, a method of managing a web application, and a non-transitory computer-readable medium.

Description of the Related Art

There has been a demand for customization of user interfaces or settings of applications installed in an image forming apparatus based on workflows that differ depending on industries or tasks.

For example, it has been already known that an administrator edits profiles, which are configuration information of an operation screen displayed on a control panel of a device, when using a Scan to Storage service. The profiles are information relating to the operation screen displayed on the control panel. The profiles include information relating to virtual keys on the screen, a layout of the screen, scanning conditions, manipulations to be performed on image data obtained by scanning, and a storage in which the image data is to be stored (delivered).

To customize the user interfaces or settings of the applications used in the image forming apparatus based on the workflows that differ depending on industries or tasks, manufacturers of the image forming apparatus gather information about a user's industry or tasks. In consideration of the gathered information, the manufacturers of the image forming apparatus incorporate, into the applications, the settings that are suitable to the user's industries or tasks.

SUMMARY

An information processing apparatus for managing one or more web applications includes a memory and circuitry. The memory includes a first memory area and a second memory area. The first memory area stores one or more pieces of application initial data, each application initial data including a set of a web application and settings of the web application, and one or more packages of the application initial data. The second memory area is associated with an organization, and stores at least one of the packages that has been sold to the organization. The circuitry copies at least one package of the packages being sold to the organization from the first memory area to the second memory area to allow an electronic device of the organization to use the web application based on the package stored in second memory area.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 12 is a view illustrating an example of an application initial data edit screen according to an embodiment of the present disclosure;

FIG. 13 is a view illustrating an example of an application initial data edit screen according to an embodiment of the present disclosure;

FIG. 15 is a sequence diagram illustrating steps in an example operation of installing the package to a tenant according to an embodiment of the present disclosure;

FIG. 19 is a view illustrating an example of an application setting edit screen according to an embodiment of the present disclosure;

FIGS. 20A to 20C are a view illustrating items and values of application settings for scanning, that are selectable by an end user according to an embodiment of the present disclosure;

FIG. 21 is a view illustrating another example of the application initial data edit screen according to another embodiment of the present disclosure;

FIG. 22 is a view illustrating another example of the application initial data edit screen according to another embodiment of the present disclosure;

FIG. 23 is a view illustrating another example of the application setting edit screen according to another embodiment of the present disclosure, and FIG. 24 is a view illustrating an example of an application setting screen according to another embodiment of the present disclosure.

Figure 1:
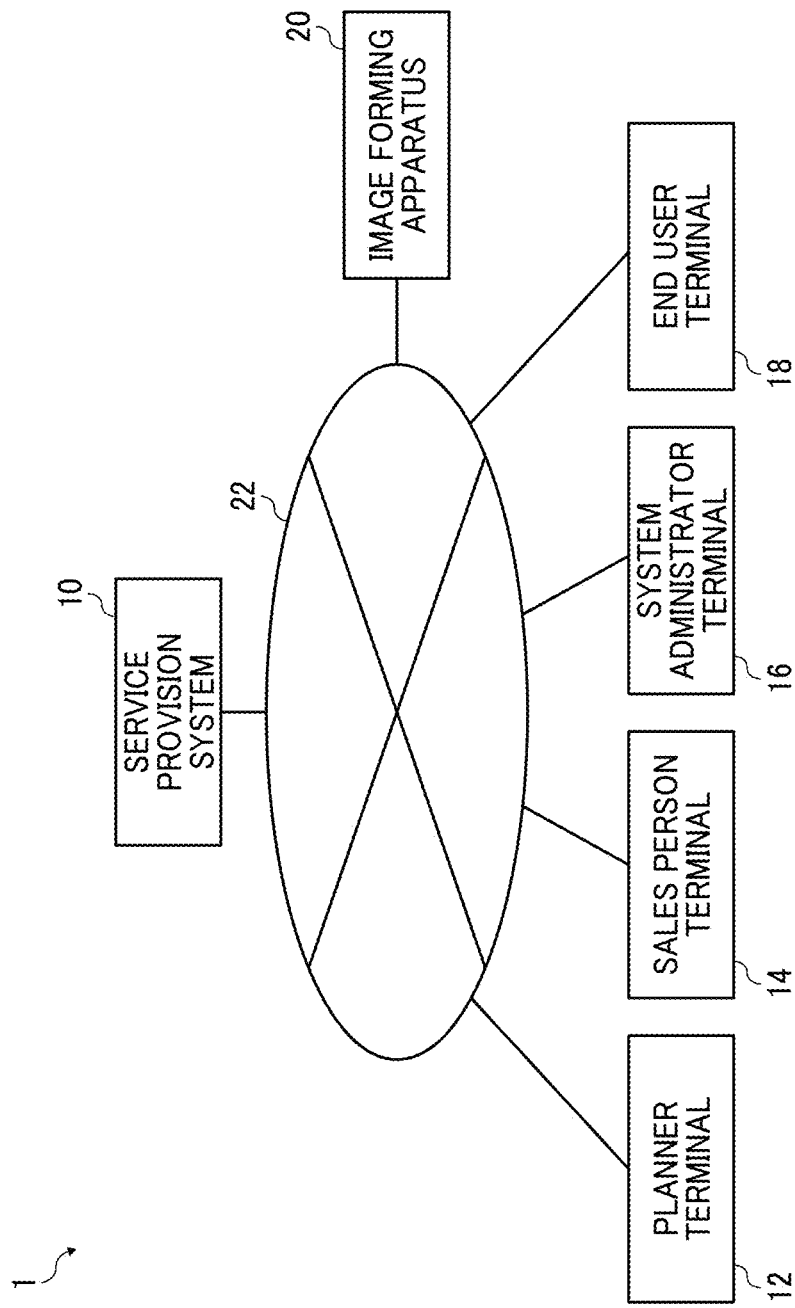
FIG. 1 is a schematic view illustrating an example configuration of an information processing system according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of several embodiments of the present disclosure with reference drawings. FIG. 1 is a schematic view illustrating an example configuration of an information processing system 1 according to an embodiment of the present disclosure. As illustrated in FIG. 1, the information processing system 1 includes a service provision system 10, a planner terminal 12, a sales person terminal 14, a system administrator terminal 16, an end user terminal 18, and an image forming apparatus 20, which are connected to one another via a network 22 such as a local area network (LAN) and the Internet.

The planner terminal 12 is a terminal apparatus operated by, for example, a planner of a manufacturer of the image forming apparatus 20. The planner accesses the service provision system 10 from the planner terminal 12 to design a product or add a package, which is described later. The sales person terminal 14 is a terminal apparatus operated by, for example, a person in charge of sales of a manufacturer of the image forming apparatus 20. The person who is in charge of sales accesses the service provision system 10 from the sales person terminal 14 to set up a tenant or install the package to the tenant, for example. For example, the person who is in charge of sales sets up the tenant and installs the package to the tenant in response to an installation request from a sales representative after the conclusion of a sales contract. The tenant is set up for each organization such as a company, a group in the company, and a division in the company, or any group of individuals.

The system administrator terminal 16 is a terminal apparatus that is operated by, for example, a system administrator on a user side. The system administrator accesses the service provision system 10 from the system administrator terminal 16 to prepare for usage. For example, the system administrator accesses the service provision system 10 from the system administrator terminal 16 to add a user to the tenant or to customize settings of an application profile. A description is given later of the preparation for usage. Further, the system administrator logs in the image forming apparatus 20 to perform preparation for enabling the image forming apparatus 20 to access the service provision system 10. For example, the system administrator performs device registration or URL registration. Alternatively, a service engineer of the manufacturer may perform the preparation for usage in place of the system administrator.

The end user terminal 18 is a terminal apparatus operated by a user of the tenant. The user of the tenant may be referred to as an "end user" hereinafter. The end user accesses the service provision system 10 from the end user terminal 18 or the image forming apparatus 20 to use Scan to Storage service or Job Print service. Each of the planner terminal 12, the sales person terminal 14, the system administrator terminal 16, and the end user terminal 18 is an information processing apparatus such as a smartphone, a mobile phone, a tablet personal computer (PC), a desktop PC, and a laptop computer.

The image forming apparatus 20 is an electronic device such as a laser printer and a multifunction peripheral (multifunction printer). A web browser is installed on the image forming apparatus 20. The web browser processes a web content received from the service provision system 10. The image forming apparatus 20 processes the web content provided from the service provision system 10 to perform processes of the Scan to Storage service or the Job Print service.

The service provision system 10 is implemented by one or more information processing apparatuses. The service provision system 10 controls a system configuration management site accessed from the planner terminal 12 or the sales person terminal 14. Further, the service provision system 10 controls a system management site accessed from the system administrator terminal 16. Furthermore, the service provision system 10 manages the tenant, the user, application data, and the application profile to provide the user with the Scan to Storage service or the Job Print service.

The configuration illustrated in FIG. 1 is just an example of the configuration of the information processing system 1, and the information processing system 1 may have any other suitable system configuration. For example, functions or processes performed by the service provision system 10 may be distributed over multiple information processing apparatuses. Further, the planner terminal 12, the sales person terminal 14, the system administrator terminal 16, the end user terminal 18, and the image forming apparatus 20 could be more than one.

Figure 2:
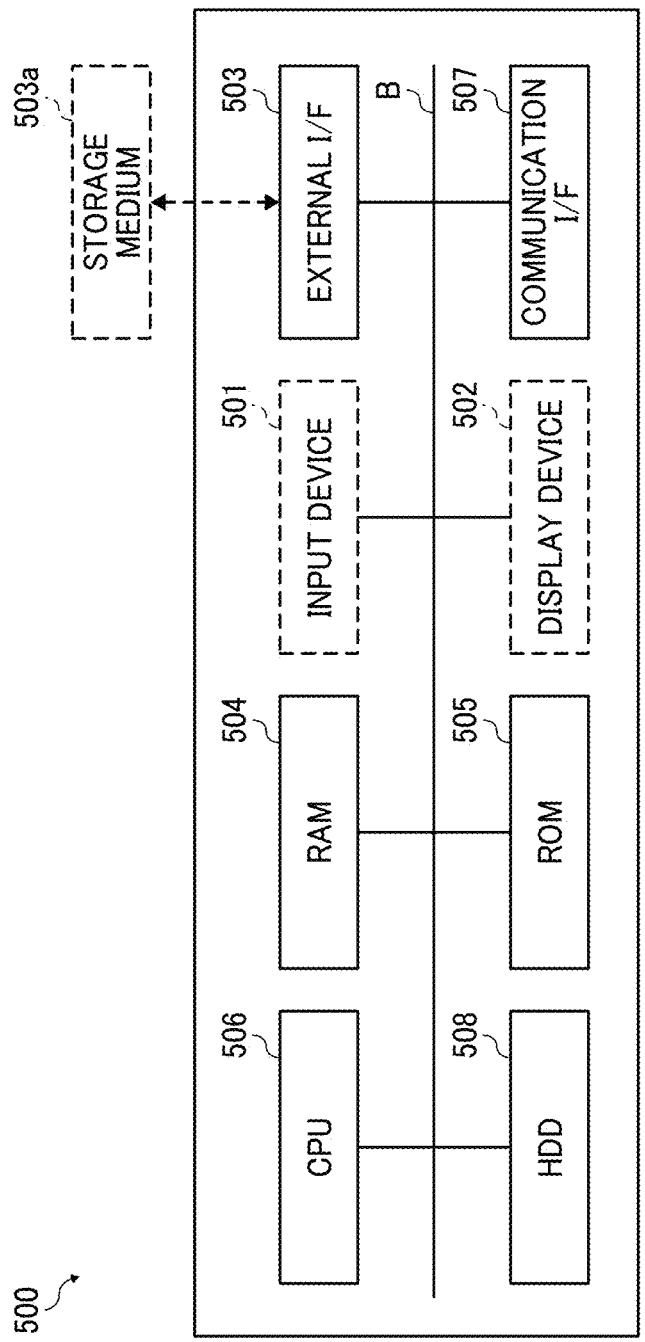
FIG. 2 is a block diagram illustrating an example hardware configuration of a computer according to an embodiment of the present disclosure.

Each of the planner terminal 12, the sales person terminal 14, the system administrator terminal 16 and the end user terminal 18 of FIG. 1 is implemented by a computer 500 having an example hardware configuration as illustrated in FIG. 2. Further, each of the one or more information processing apparatuses that implement the service provision system 10 is also implemented by the computer 500 having an example hardware configuration as illustrated in FIG. 2.

FIG. 2 is a block diagram illustrating an example hardware configuration of the computer 500. As illustrated in FIG. 2, the computer 500 includes an input device 501, a display device 502, an external interface 503, a random access memory (RAM) 504, a read only memory (ROM) 505, a central processing unit (CPU) 506, a communication interface 507, and a hard disc drive (HDD) 508, which are connected to one another via a bus B. It should be noted that the input device 501 and the display device 502 are not necessarily constantly connected to the bus B. In other words, the input device 501 and the display device 502 could be connected to the bus B as necessary when used.

The input device 501 includes a keyboard, a mouse, and/or a touch panel enabling a user to input various operation instruction. The display device 502 includes a display on which results of processing by the computer 500 are displayed.

The communication interface 507 is an interface device to connect the computer 500 to various networks. The computer 500 performs data communication via the communication interface 507.

The HDD 508 is an example of a nonvolatile storage device that stores programs or data therein. Examples of the programs or data stored in the HDD 508 include an operating system (OS) for controlling an entire operation of the computer 500 and application software providing various functions on the OS. The computer 500 may include, instead of the HDD 508, a drive device such as a solid state drive that uses a flash memory as a storage medium.

The external interface 503 is an interface device with an external device. Examples of the external device include a storage medium 503a. The external interface 503 enables the computer 500 to read or write data from or to the storage medium 503a. Examples of the storage medium 503a include a flexible disc, a compact disc (CD), a digital versatile disc (DVD), a SD memory card, and a universal serial bus (USB) memory.

The ROM 505 is an example of a nonvolatile semiconductor memory (storage device), which holds programs or data even after the computer 500 is turned off as the power is not supplied. The ROM 505 stores programs and data such as a basic input output system (BIOS), which is executed when the computer 500 starts up, OS settings, and network settings. The RAM 504 is an example of a volatile semiconductor memory (storage device), which holds programs or data temporarily.

The CPU 506 reads programs or data from a storage device such as the ROM 505 and the HDD 508 onto the RAM 504, and executes processing to implement the entire control of the computer 500 or functions of the computer 500. The planner terminal 12, the sales person terminal 14, the system administrator terminal 16, and the end user terminal 18 implement processes or functions as described later with the example hardware configuration of the computer 500 as illustrated in FIG. 2. Further, the service provision system 10 implements processes or functions as described later with one or more computers 500 having the example hardware configuration as illustrated in FIG. 2.

Figure 3:
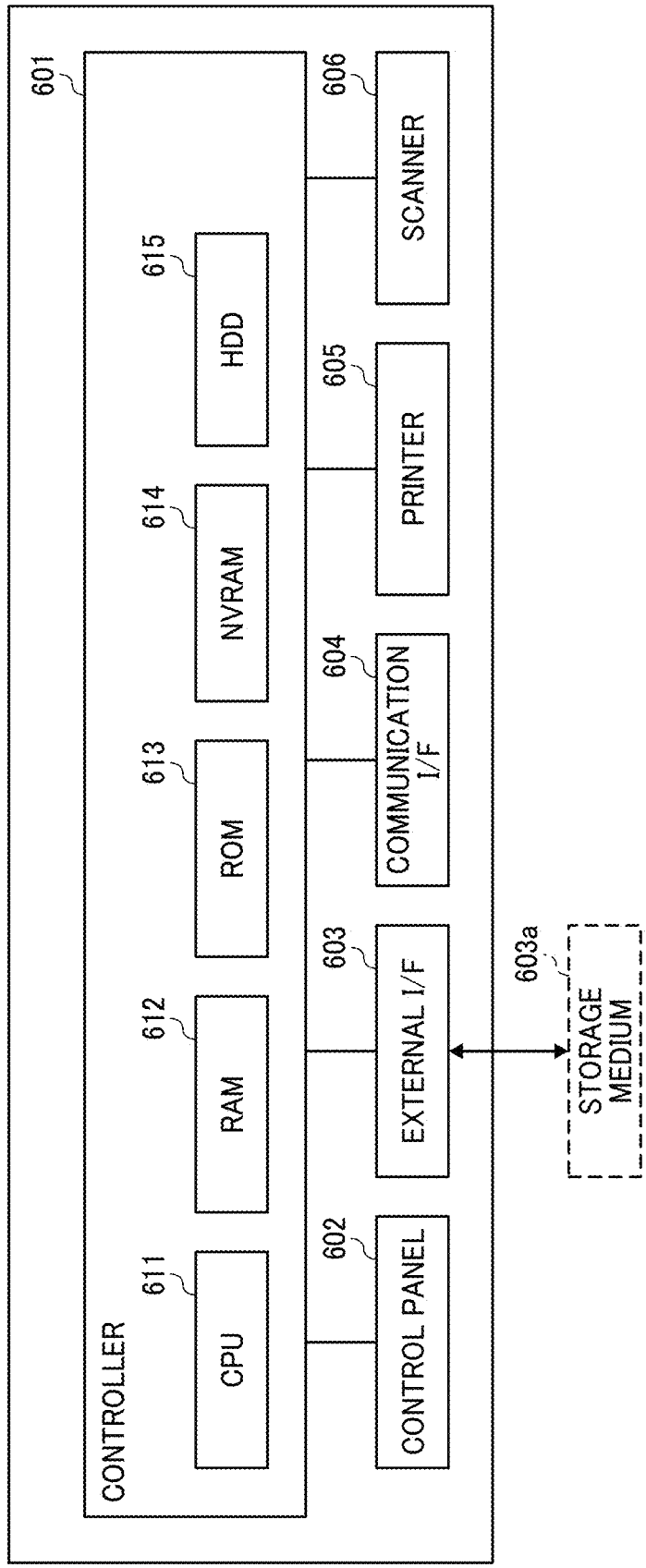
FIG. 3 is a block diagram illustrating an example hardware configuration of an image forming apparatus according to an embodiment of the present disclosure.

The image forming apparatus 20 illustrated in FIG. 1 has a hardware configuration as illustrated in FIG. 3. FIG. 3 is a block diagram illustrating an example hardware configuration of the image forming apparatus 20. As illustrated in FIG. 3, the image forming apparatus 20 includes a controller 601, a control panel 602, an external interface 603, a communication interface 604, a printer 605, and a scanner 606.

The controller 601 includes a CPU 611, a RAM 612, a ROM 613, a non-volatile random access memory (NVRAM) 614, and a HDD 615. The ROM 613 stores various programs and data. The RAM 612 stores programs and data temporarily. The NVRAM 614 stores setting information, etc., for example. The HDD 615 stores various programs and data.

The CPU 611 performs processing according to the programs, data, setting information, etc., read from the ROM 613, the NVRAM 614, the HDD 615, etc., onto the RAM 612 to control an entire operation of the image forming apparatus 20 and implement functions.

The control panel 602 includes an input unit that receives a user input, and a display unit that displays various types of information. The external interface 603 is an interface device with an external device. Examples of the external device include a storage medium 603a. The external interface 603 enables the image forming apparatus 20 to read or write data from or to the storage medium 603a. Examples of the storage medium 603a include an IC card, a flexible disc, a CD, a DVD, a SD memory card, and a USB memory.

The communication interface 604 is an interface device to connect the image forming apparatus 20 to the network 22. The image forming apparatus 20 performs data communication via the communication interface 604. The printer 605 is a printing device that forms an image on a transferred medium in accordance with print data. Examples of the transferred medium include paper, coated paper, thick paper, overhead projector (OHP) transparencies, plastic films, pre-preg, and copper foil. The scanner 606 is a reading device that scans a document to obtain image data (electronic data).

Figure 4:
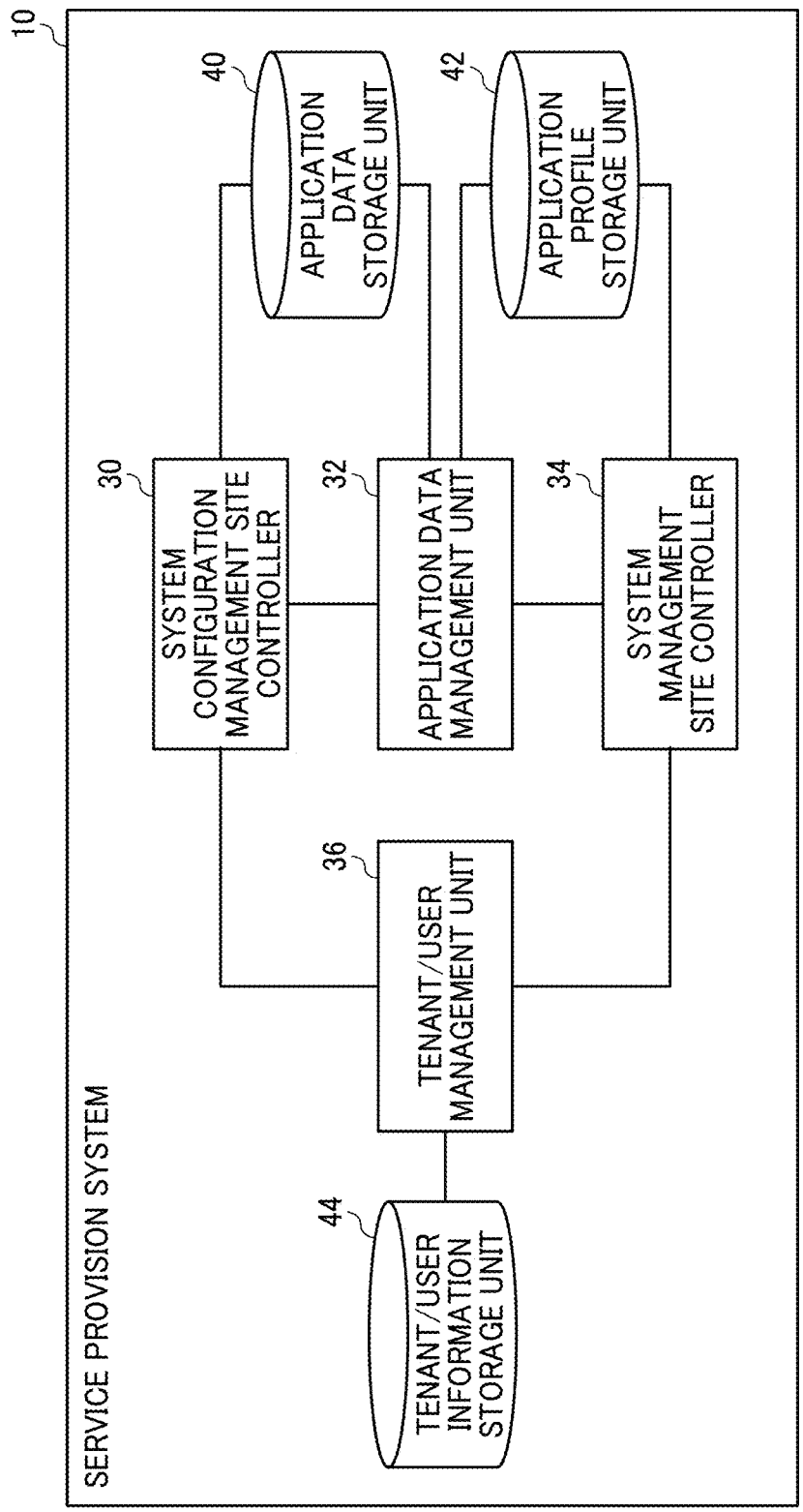
FIG. 4 is a block diagram illustrating an example functional configuration of a service provision system according to an embodiment of the present disclosure.

The service provision system 10 according to the present embodiment is implemented by processing blocks as illustrated in FIG. 4, for example. FIG. 4 is a block diagram illustrating an example functional configuration of the service provision system 10 according to the present embodiment. The functional blocks of the service provision system 10 as illustrated in FIG. 4 are implemented by the one or more programs stored in the HDD 508 or the ROM 505, which operate in cooperation with hardware as illustrated in FIG. 2.

As illustrated in FIG. 4, the service provision system 10 includes a system configuration management site controller 30, an application data management unit 32, a system management site controller 34, and a tenant/user management unit 36. Further, the service provision system 10 includes an application data storage unit 40, an application profile storage unit 42, and a tenant/user information storage unit 44.

The application data storage unit 40 stores application data, which are described later. The application profile storage unit 42 stores an application profile, which is described later. The tenant/user information storage unit 44 stores tenant information and user information.

The system configuration management site controller 30 controls the system configuration management site accessed from the planner terminal 12 or the sales person terminal 14. The application data management unit 32 manages the application data stored in the application data storage unit 40 and the application profile stored in the application profile storage unit 42. The system management site controller 34 controls the system management site accessed from the system administrator terminal 16. The tenant/user management unit 36 manages the tenant information and the user information stored in the tenant/user information storage unit 44.

Figure 5:
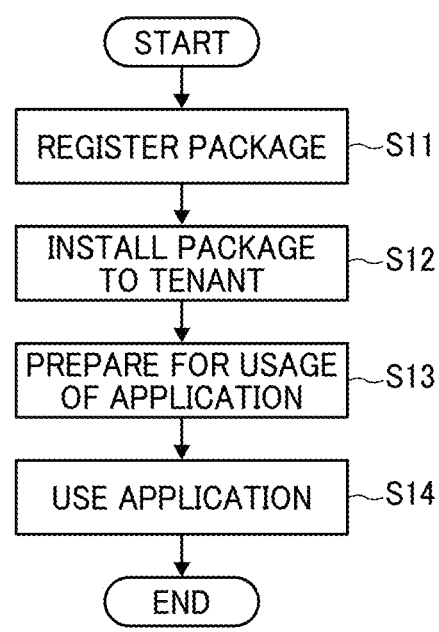
FIG. 5 is a flowchart illustrating steps in an operation performed by the information processing system according to an embodiment of the present disclosure.

The information processing system 1 according to the present embodiment performs steps in an operation as illustrated in FIG. 5, for example, to implement processes from registration of a web application (referred to as "application", hereinafter) that is to be sold to a tenant to utilization of the application by the end user.

FIG. 5 is a flowchart illustrating steps in an operation performed by the information processing system 1 according to the present embodiment. At S11, the planner accesses the system configuration management site of the service provision system 10 from the planner terminal 12 to design application initial data and register the package, for example. Detailed descriptions are given later of the design of the application initial data and the package.

At S12, the person who is in charge of sales accesses the system configuration management site of the service provision system 10 from the sales person terminal 14 to set up the tenant or install the package to the tenant based on an installation request from a sales representative after the conclusion of a sales contract.

At S13, the system administrator accesses the system management site of the service provision system 10 from the system administrator terminal 16 to perform preparation for usage such as adding a user to the tenant and customizing the application profile settings described later. Further, the system administrator logs in the image forming apparatus 20 to perform preparation for enabling the image forming apparatus 20 to access the service provision system 10. The process at S13 enables the end user to use the application of the package installed to the tenant.

At S14, the end user accesses the service provision system 10 from the end user terminal 18 or the image forming apparatus 20 to use the application contained in the package installed to the tenant. The end user may access the service provision system 10 from the end user terminal 18 to configure personal application settings.

Figure 6:
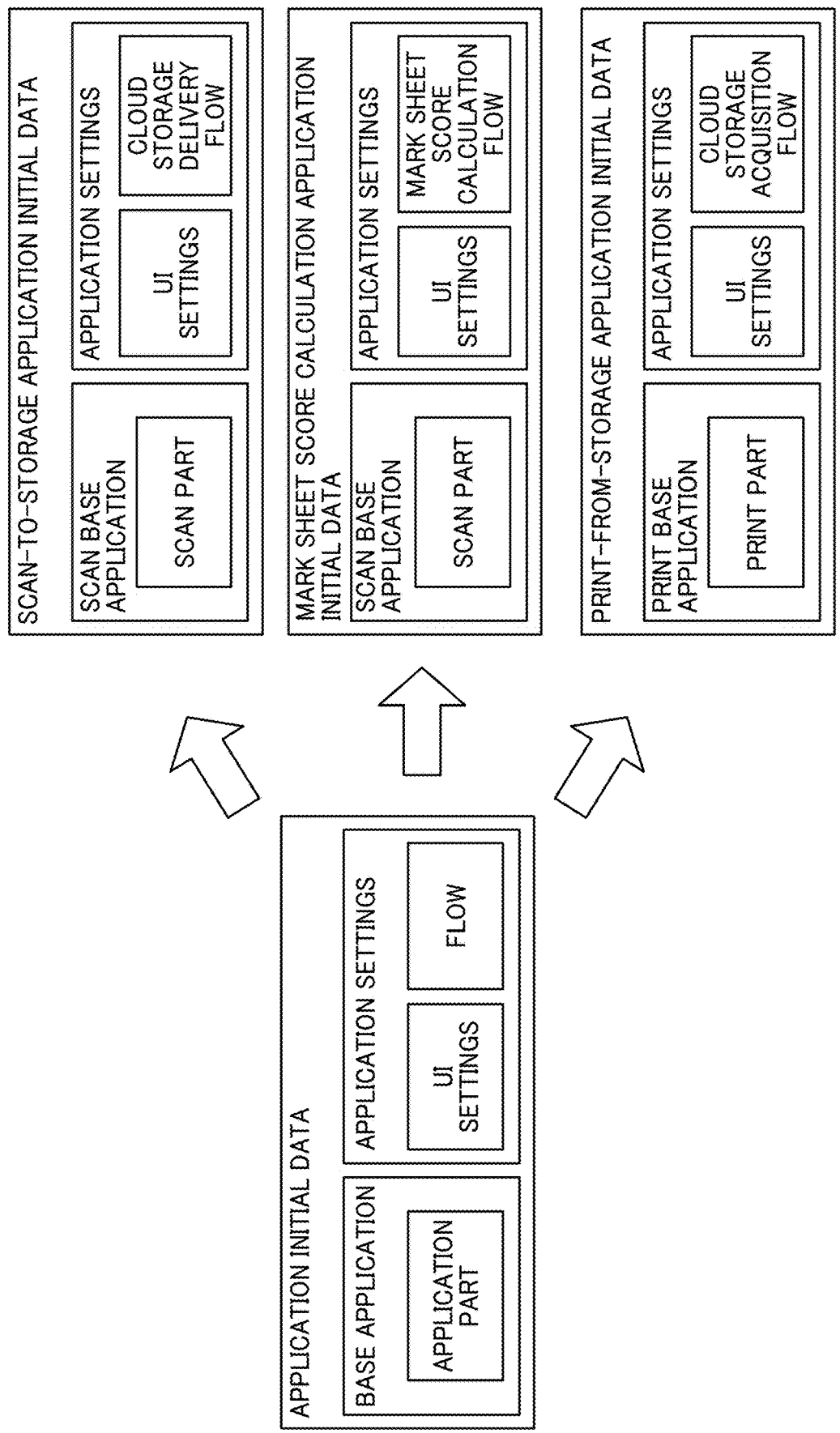
FIG. 6 is an illustration for explaining a structure of application initial data according to an embodiment of the present disclosure.

Hereinafter, descriptions are given of the application initial data, the package, and the application profile according to the present embodiment. FIG. 6 is an illustration for explaining a structure of the application initial data according to the present embodiment. As illustrated in FIG. 6, the application initial data includes a base application and an application setting.

The base application is a module having a screen constituting a basis. Examples of the base application include a scan base application, a print base application, and a storage base application. An application part contained in the base application is a module that sets a function such as scanning and printing, for example, to control operation of the image forming apparatus 20.

The application setting is a set of initial setting values that the application possesses. The application setting includes a user interface (UI) setting and a flow. The UI setting is a setting of a label or an icon. The flow is a flow executed by the application part after scanning or before printing.

For example, the planner of the manufacturer designs the application initial data as illustrated on the right side of the FIG. 6, and registers the application initial data with the service provision system 10 via the system configuration management site. Initial data of the Scan to Storage application, initial data of a mark sheet score calculation application, and initial data of a Print from Storage application illustrated on the right of FIG. 6 are examples of the application initial data designed by the planner.

For example, the initial data of the Scan to Storage application include a scan base application as the base application. Further, the initial data of the Scan to Storage application include a cloud storage delivery flow as the flow of the application setting. The initial data of the mark sheet score calculation application include the scan base application as the base application. Further, the initial data of the mark sheet score calculation application include a mark sheet score calculation flow as the flow of the application setting.

The initial data of the Print from Storage application include a print base application as the base application. Further, the initial data of the Print from Storage application include a cloud storage acquisition flow as the flow of the application setting. The planner of the manufacturer is able to design the application initial data as illustrated in FIG. 6 constituted by the combination of the base application and the application setting, and register the application initial data with the service provision system 10.

Further, the planner of the manufacturer is able to change the flow of the application initial data, resulting in change in processing of the application. For example, the planner replaces the flow of the application initial data to change a destination to which scanned data is to be delivered or to add notification by an email. The planner of the manufacturer is able to register the application initial data adapting to a desired industry or task as well as standard application initial data with the service provision system 10, as illustrated in FIG. 6. Further, the planner of the manufacturer or the like is able to customize the application initial data that has been registered with the service provision system 10 to create or register new application initial data.

Figure 7:
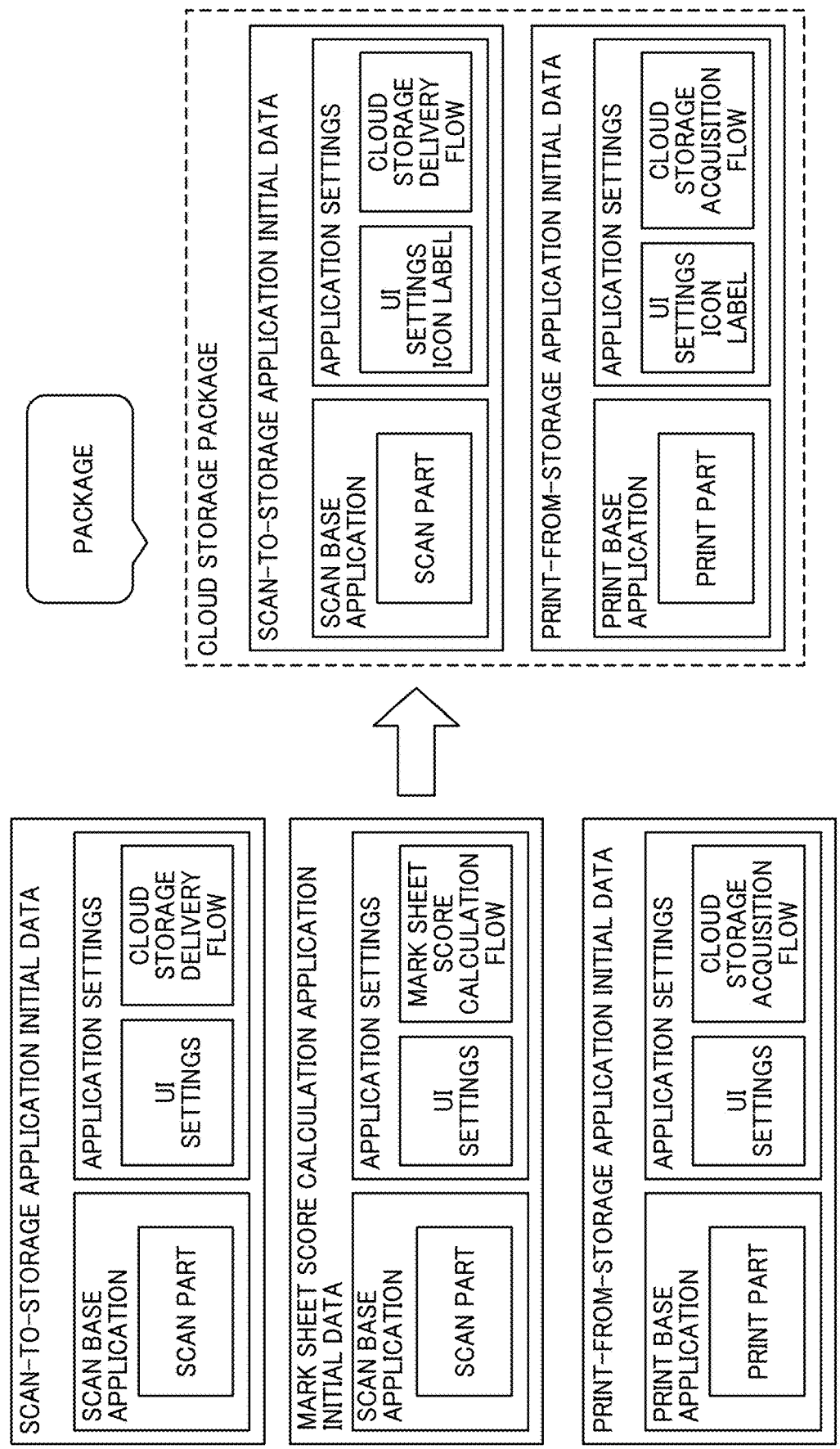
FIG. 7 is an illustration for explaining a structure of a package according to an embodiment of the present disclosure.

FIG. 7 is an illustration for explaining a structure of the package according to the present embodiment. As illustrated in FIG. 7, the package is constituted by one or more pieces of application initial data illustrated in FIG. 6 that are packaged. For example, the planner creates a package dedicated to a specific industry or a package dedicated to a specific task as well as a standard package. Further, the planner registers the created package with the service provision system 10.

FIG. 7 illustrates an example in which the initial data of the Scan to Storage application and the initial data of the Print form Storage application illustrated in FIG. 6 are packaged in to a cloud storage package. The planner is able to create a package for preparation (storage) in advance taking into consideration how to sell the application as a sales item.

Figure 8:
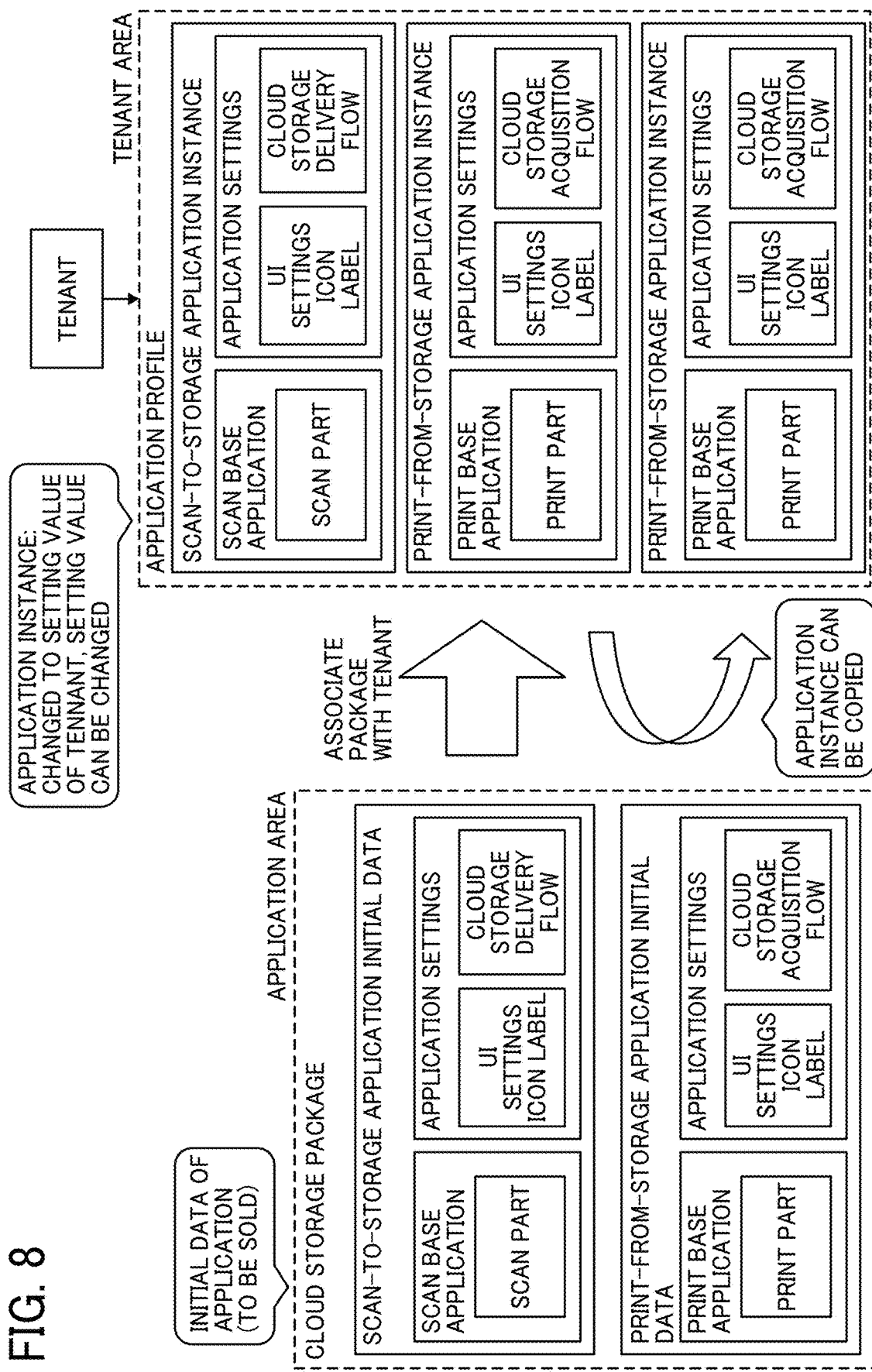
FIG. 8 is an illustration for explaining a structure of an application profile according to an embodiment of the present disclosure.

For example, a sales representative sells the package as illustrated in FIG. 7, which is a sales item registered with the service provision system 10, to a customer or makes a sales contract with the customer. The person who is in charge of sales installs, to the tenant, the package for which the sales representative made the sales contract with the customer. For example, the installation of the package to the tenant is implemented by installing (copying) the package from an application area to a tenant area to associate the package with the tenant, as illustrated in FIG. 8. FIG. 8 is an illustration for explaining a structure of the application profile according to the present embodiment.

The application area is an area in which the package is stored. The tenant is an area that is provided for each of a plurality of tenants. In the present disclosure, the package that is associated with the tenant is referred to as the application profile. In the application profile, the initial setting value contained in the application initial data of the package is converted to a setting value of the tenant. The system administrator is able to change the setting value of the tenant contained in the application profile, as described later. Further, the end user is able to define a desired setting from items selectable according to the setting value of the tenant.

For example, in FIG. 8, the application initial data contained in the package is converted to an application instance contained in the application profile. As illustrated in FIG. 8, the application instance may be copied in the tenant area.

Figure 9:
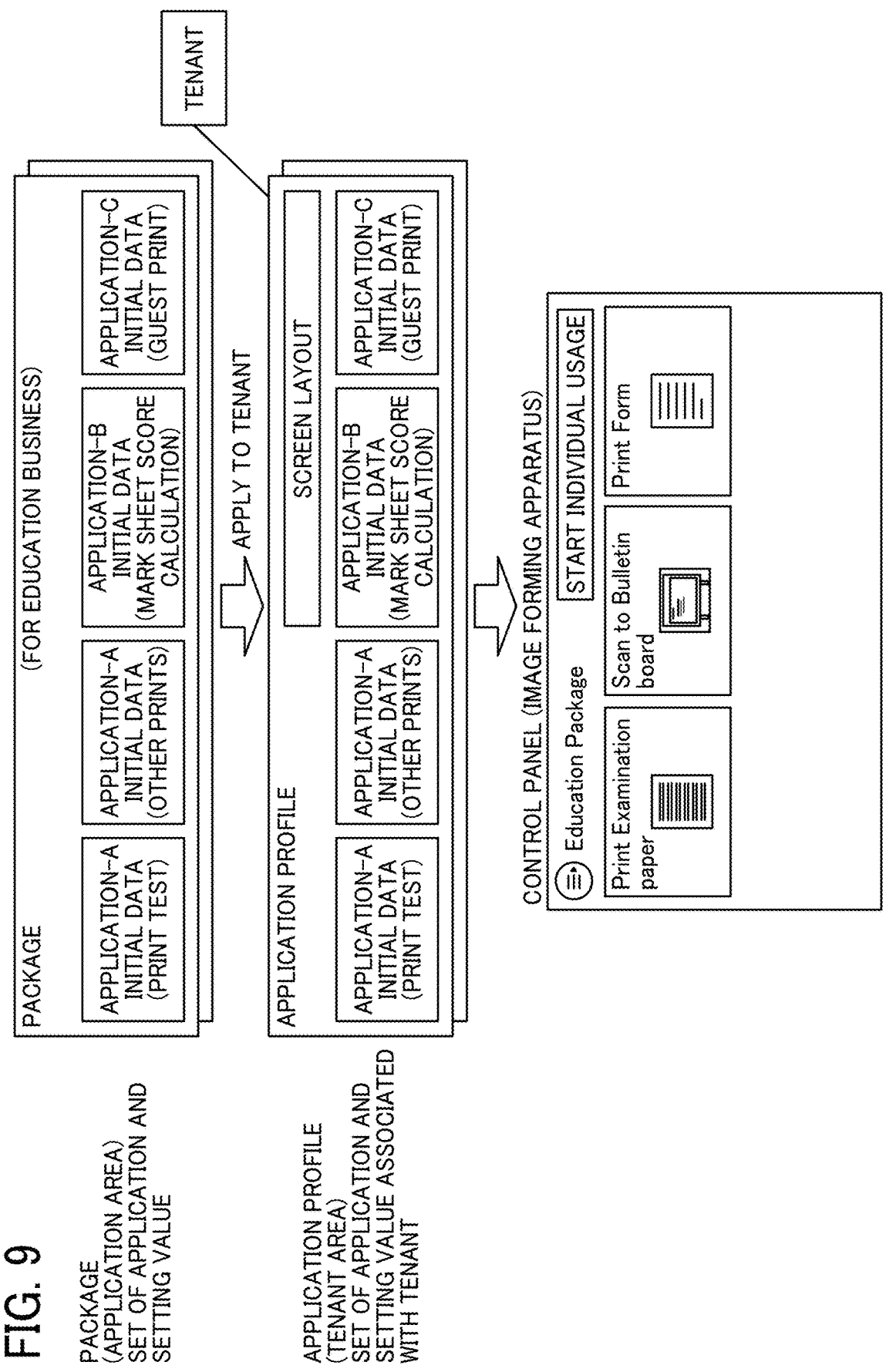
FIG. 9 is an illustration for explaining relations among the package, the application profile, and a screen of the image forming apparatus according to an embodiment of the present disclosure.

FIG. 9 is an illustration for explaining relations among the package, the application profile and a screen of the image forming apparatus 20. As illustrated in FIG. 9, the package is converted to the application profile when applied to the tenant. A home screen as illustrated in FIG. 9 is displayed on the control panel 602 of the image forming apparatus 20 based on the application profile associated with the tenant. The home screen corresponds to the application profile.

Figure 10:
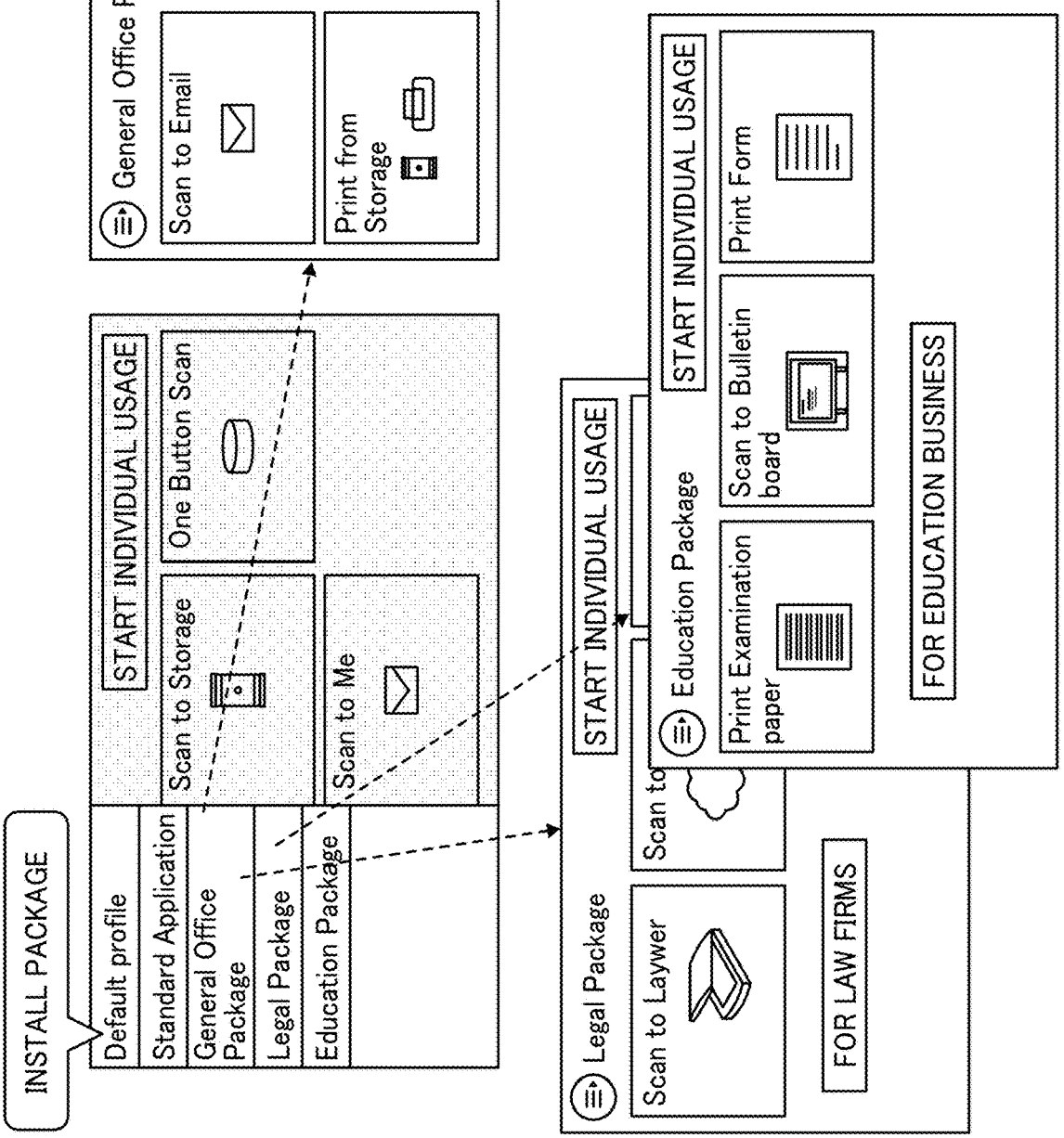
FIG. 10 is an illustration for explaining the transition of a home screen according to an embodiment of the present disclosure.

In the image forming apparatus 20, the home screen displayed on the control panel 602 of the image forming apparatus 20 transitions as illustrated in FIG. 10 according to an instruction given by the user of the tenant. FIG. 10 is an illustration for explaining the transition of the home screen. As indicated in a screen image illustrated in the upper left portion of FIG. 10, a list of the application packages installed to the tenant is displayed on the control panel 602 of the image forming apparatus 20. The user of the tenant selects a desired application package from the list of the application packages displayed on the control panel 602. The home screen of the application package that the user selected on the control panel 602 is displayed.

Figure 11:
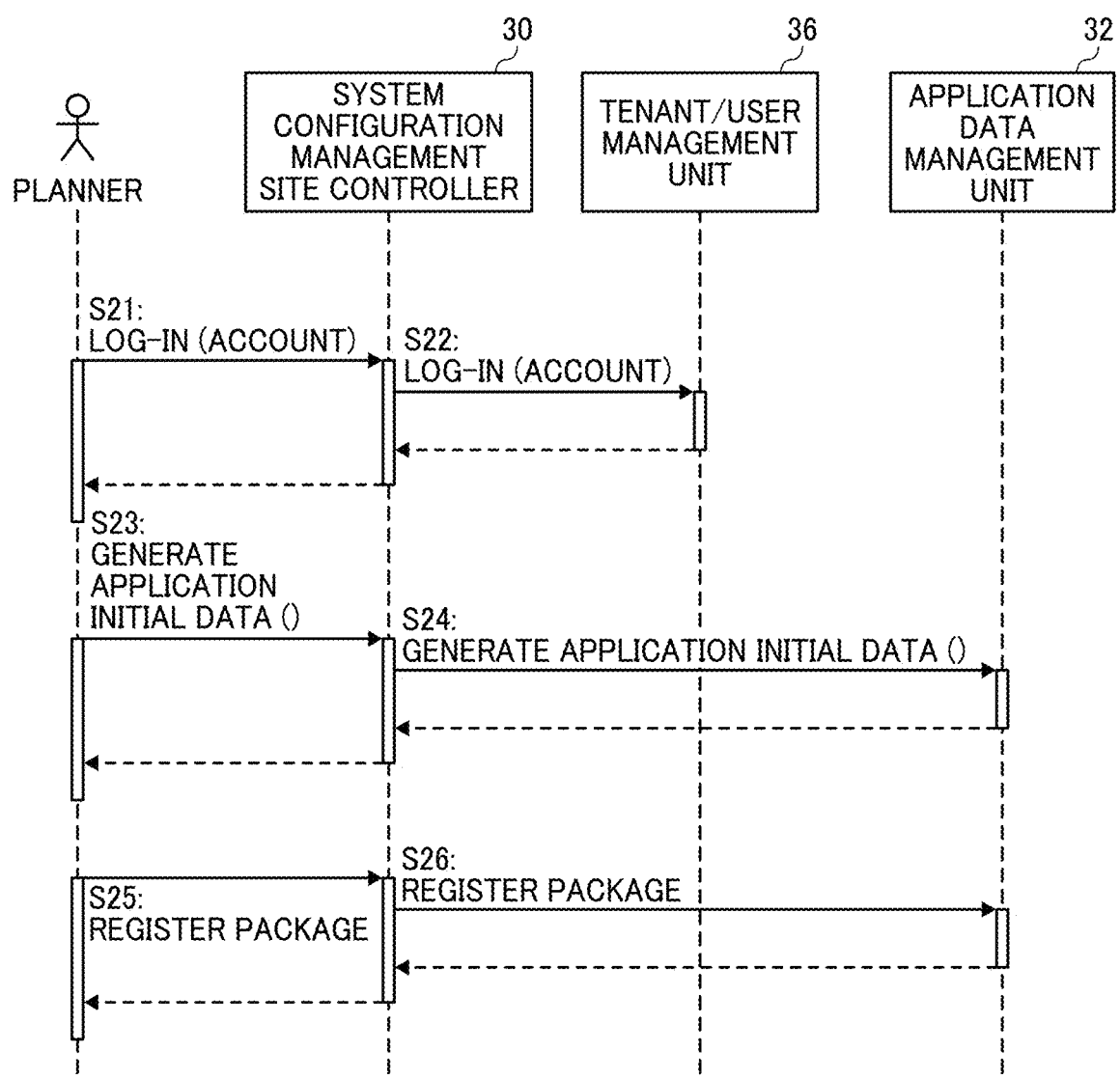
FIG. 11 is a sequence diagram illustrating steps in an example operation of registering the package according to an embodiment of the present disclosure.

FIG. 11 is a sequence diagram illustrating steps in an example operation of registering the package performed at S11 of FIG. 5. At S21 and S22, the planner logs in the system management site of the service provision system 10 from the planner terminal 12. Specifically, at S21, the planner terminal 12 sends a request for logging in the system configuration management site to the system configuration management site controller 30 according to the planner's instruction. At S22, the system configuration management site controller 30 sends the request for login to the tenant/user management unit 36.

When the login is successful, the planner registers the application initial data with the service provision system 10 from the planner terminal 12. Specifically, at S23, the planner terminal 12 sends a request for generation of the application initial data to the system configuration management site controller 30 according to the planner's instruction. At S24, the system configuration management site controller 30 sends the request for generation of the application initial data to the application data management unit 32. For example, the system configuration management site controller 30 causes the planner terminal 12 to display an application initial data edit screen as illustrated in FIGS. 12 and 13 to accept the instruction for registration of the application initial data from the planner.

FIGS. 12 and 13 are views, each illustrating an example of the application initial data edit screen. The application initial data edit screen illustrated in FIGS. 12 and 13 is an application initial data edit screen for the Scan to Storage application. In FIG. 12, entry fields for application initial data settings are illustrated. In FIG. 13, entry fields for application job settings are illustrated.

Figure 14:
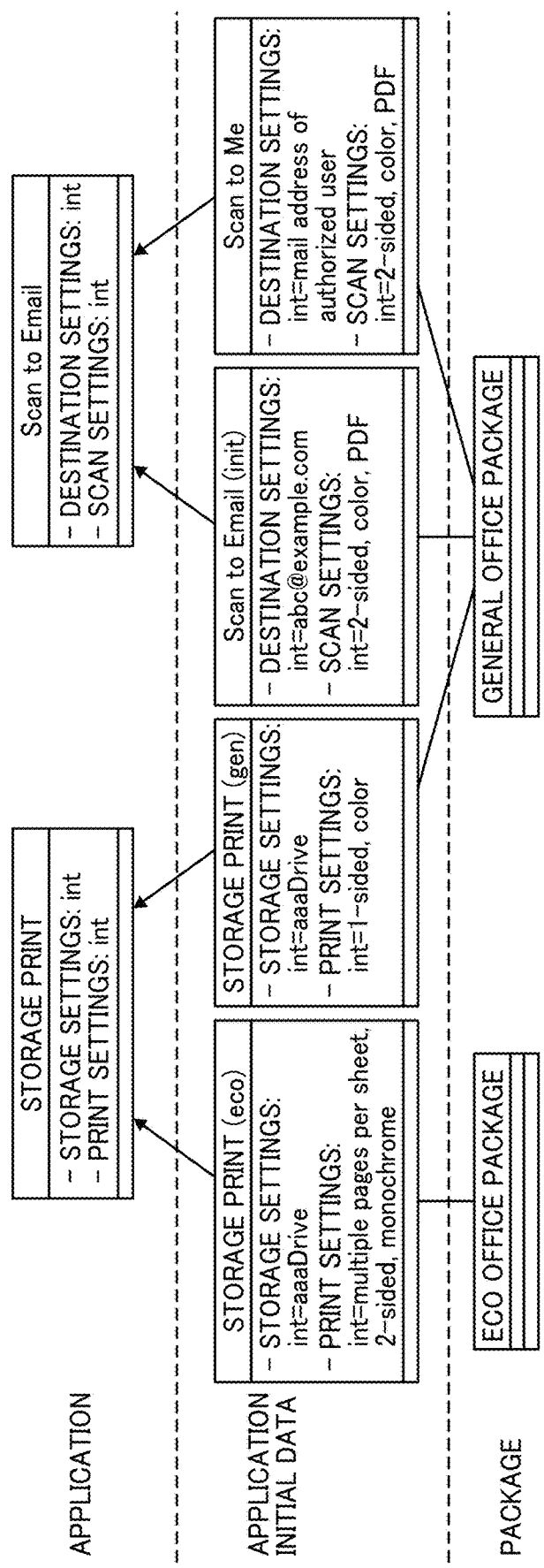
FIG. 14 is an object diagram illustrating an example of the package according to an embodiment of the present disclosure.

Referring again to the sequence diagram of FIG. 11, at S25 and S26, the planner registers the package with the service provision system 10 from the planner terminal 12. Specifically, at S25, the planner terminal 12 sends a request for registration of the package to the system configuration management site controller 30. At S26, the system configuration management site controller 30 sends the request for registration of the package to the application data management unit 32. With the processes of S25 and S26, the package as indicated by an object diagram of FIG. 14 is registered in the application data storage unit 40 of the service provision system 10. FIG. 14 is an object diagram illustrating an example of the package. As illustrated in FIG. 14, the package includes one or more applications, each being associated with the application initial data.

FIG. 15 is a sequence diagram illustrating steps in an example operation of installing the package to the tenant performed at S12 of FIG. 5. At S31, the person who is in charge of sales requests the service provision system 10 to set up the tenant from the sales person terminal 14. Specifically, at S31, the sales person terminal 14 sends a request for setup of the tenant to the system configuration management site controller 30 according to an instruction given by the person who is in charge of sales.

At S32, the system configuration management site controller 30 of the service provision system 10 sends the request for generation of the tenant to the tenant/user management unit 36. At S33, the tenant/user management unit 36 assigns a tenant ID to generate the tenant. At S34, the system configuration management site controller 30 performs user registration for the system administrator of the tenant.

At S35, the person who is in charge of sales requests acquisition of package information registered in the service provision system 10 from the sales person terminal 14. Specifically, the sales person terminal 14 sends, to the system configuration management site controller 30, a request for acquisition of the package information registered in the service provision system 10. At S36, the system configuration management site controller 30 of the service provision system 10 requests the application data management unit 32 to acquire information listing the packages. The application data management unit 32 sends the information listing the packages stored in the application data storage unit 40 to the system configuration management site controller 30. The system configuration management site controller 30 causes the sales person terminal 14 to display the information listing the packages stored in the application data storage unit 40.

Figures 16A, 16B:
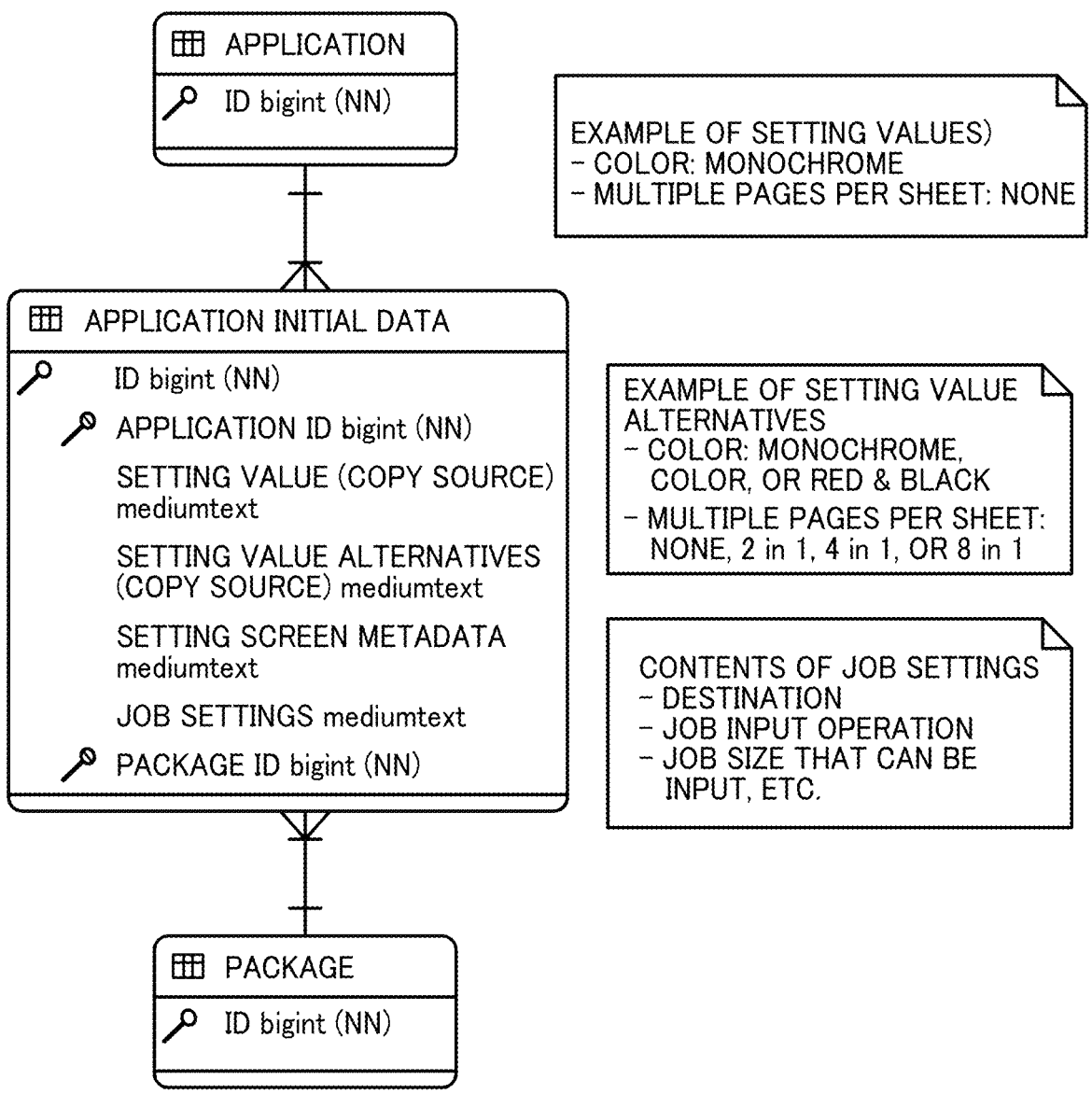
FIGS. 16A and 16B are a view illustrating a relation between the package in an application area and the application profile in a tenant area according to an embodiment of the present disclosure.
Figure 16B:
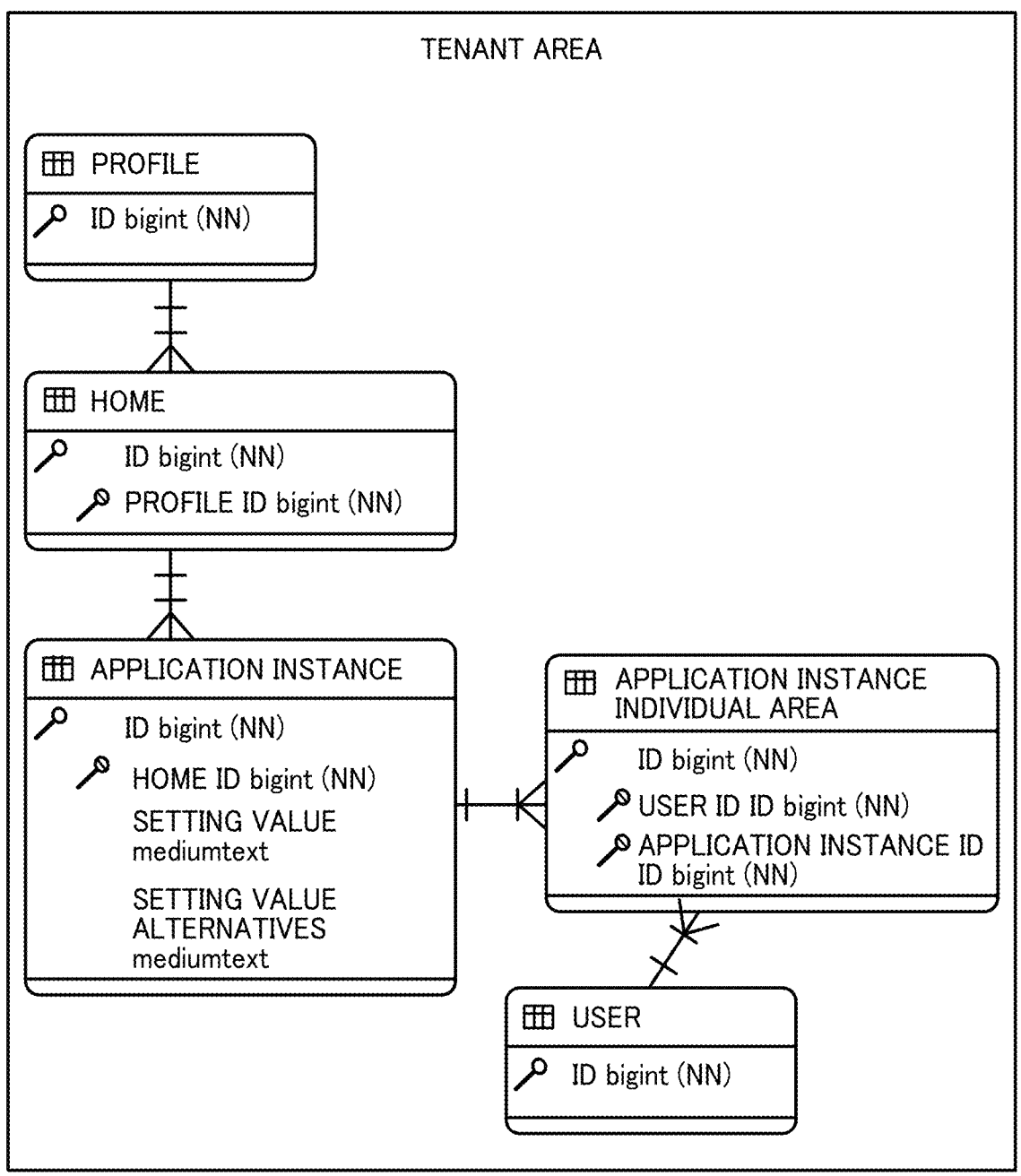

At S37, the person who is in charge of sales selects a desired package and requests the service provision system 10 to install the selected package to the tenant from the sales person terminal 14. At S38, the system configuration management site controller 30 of the service provision system 10 requests the application data management unit 32 to install the package to the tenant. The application data management unit 32 installs the package in the application area to the tenant area as the application profile, as illustrated in FIG. 8. FIGS. 16A and 16B are a view illustrating a relation between the package in the application area and the application profile in the tenant area.

Figure 17:
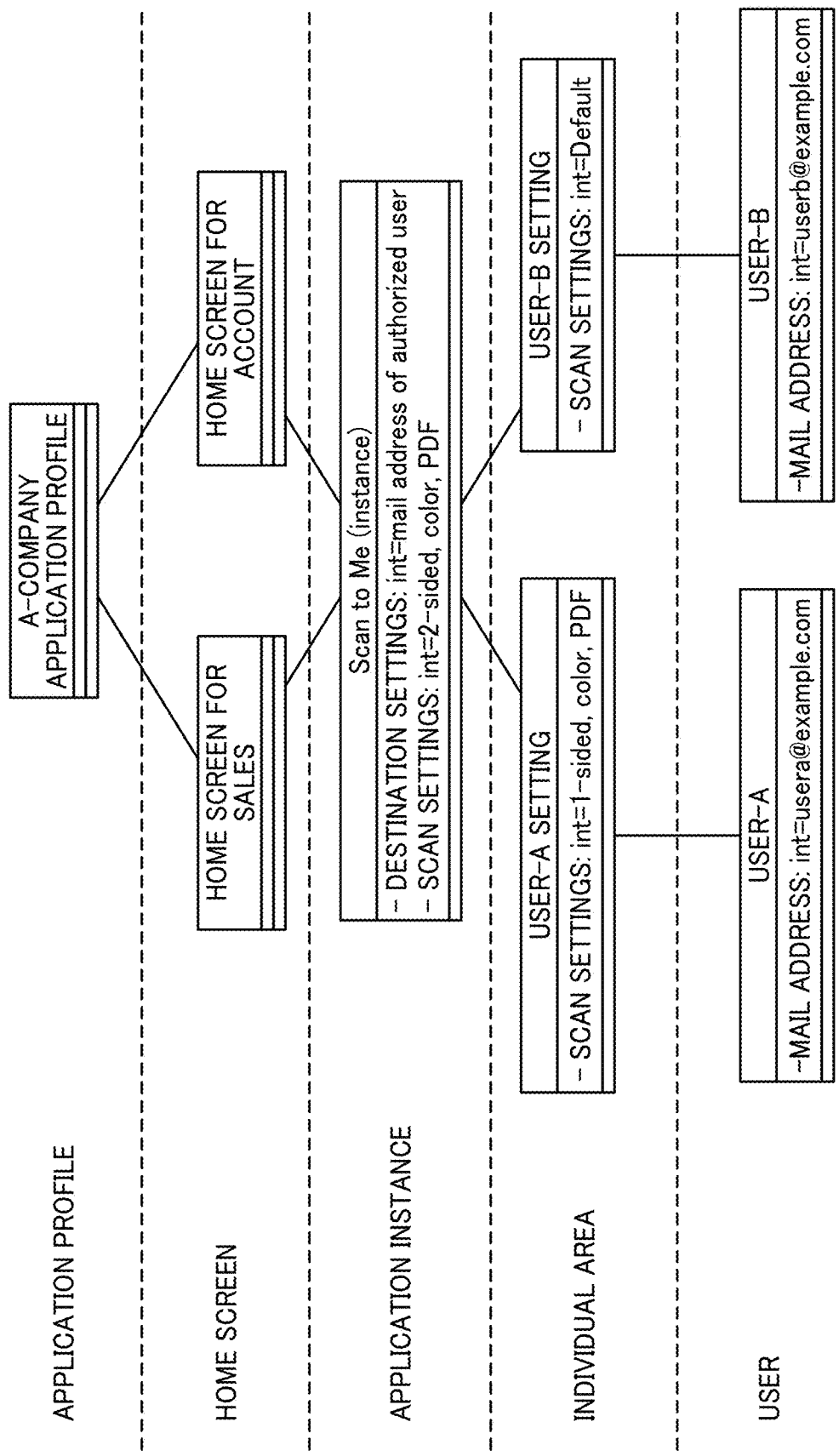
FIG. 17 is an object diagram illustrating an example of the application profile according to an embodiment of the present disclosure.

With the processes of S37 and S38, the application profile as indicated by an object diagram of FIG. 17 is registered in the application profile storage unit 42 of the service provision system 10. FIG. 17 is an object diagram illustrating an example of the application profile.

Hereinafter, a description is given of the preparation of usage of the application performed at S13 of FIG. 5. The system administrator accesses the system management site of the service provision system 10 from the system administrator terminal 16 to perform preparation of usage. For example, the system administrator accesses the system management site from the system administrator terminal 16 to add a user to the tenant or to customize the setting of the application profile. For example, the system management site controller 34 causes the system administrator terminal 16 to display an icon/label edit screen as illustrated in FIG. 18 and an application setting edit screen as illustrated in FIG. 19 to accept an instruction from the system administrator for editing an icon and a label or for editing the application settings.

Figure 18:
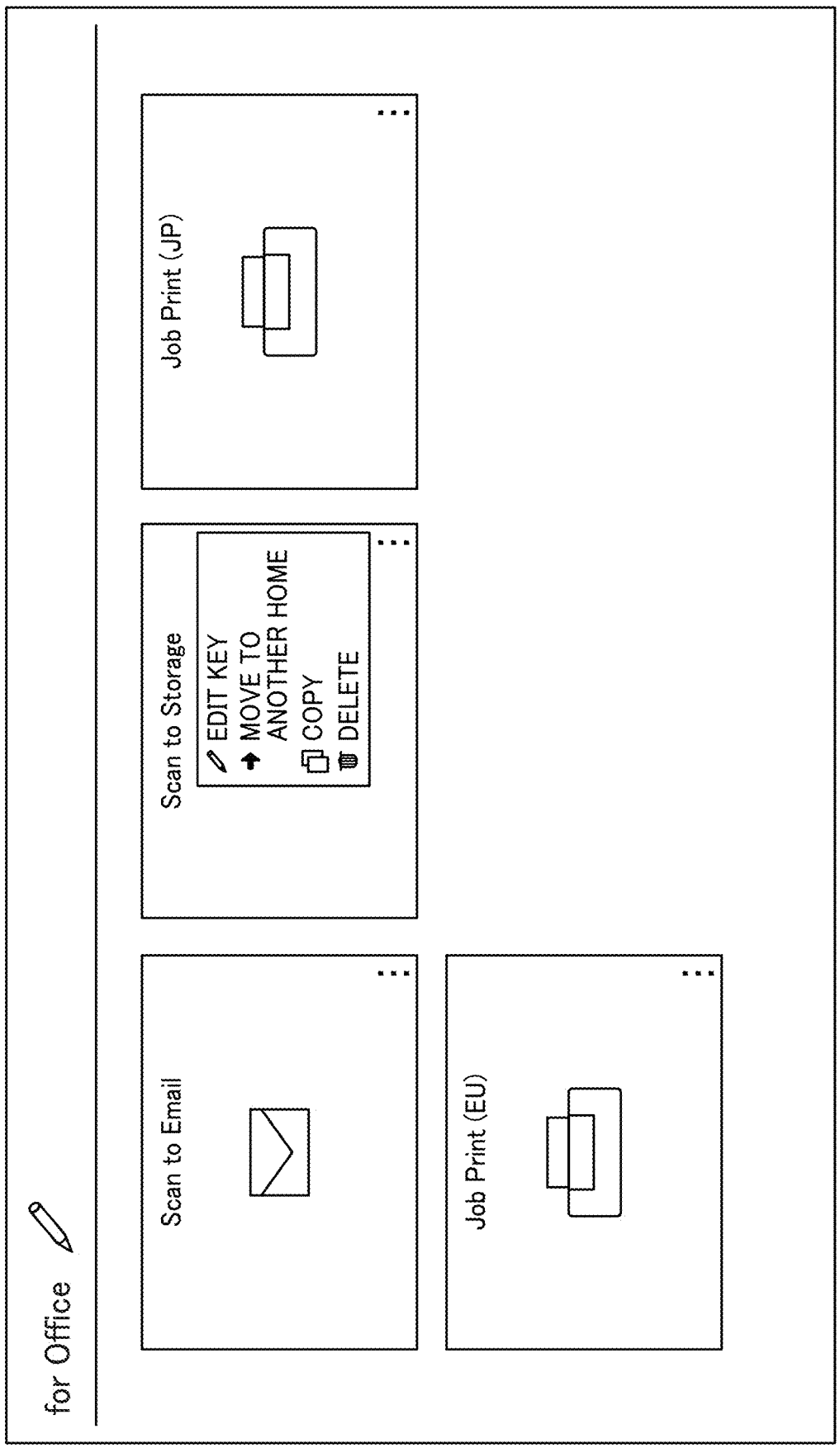
FIG. 18 is a view illustrating an example of an icon/label edit screen according to an embodiment of the present disclosure.

FIG. 18 is a view illustrating an example of the icon/label edit screen. The icon/label edit screen illustrated in FIG. 18 corresponds to a certain home screen. The system administrator edits the icon or the label of the application instance corresponding to the application profile via the icon/label edit screen illustrated in FIG. 18.

FIG. 19 is a view illustrating an example of the application setting edit screen. The application setting edit screen illustrated in FIG. 19 is an application setting edit screen for a Scan to Storage application instance. The system administrator edits the application settings of the Scan to Storage application instance via the application setting edit screen illustrated in FIG. 19.

Hereinafter, a description is given of the usage of the application performed at S14 of FIG. 5. The end user accesses the home screen of the service provision system 10 from the end user terminal 18 or the image forming apparatus 20 to use the application contained in the package installed to the tenant. Further, the end user is able to define the user's own setting in a personal area in a selectable range according to the setting value of the application instance of the tenant.

Hereinafter, a description is given of a range of the application setting that can be customized by the planner and the system administrator. It is assumed that the following items are all items that can be customized in the application.

All items:
Icon
Label
Scan and print settings
  Default value
  List of selectable items
Job settings
  Connection destination flow (Aggregation of external service authorization information necessary for components belonging to all flows in the tenant)
  Job input means (Email, Port Monitor (PM), Mobile, Personal computer (PC), Near-field communication (NFC), Multifunction peripherals (MFP), Printer, Facsimile, Electronic white board, Third party's MFP, Third party's cloud service)
  Authentication means (Tenant ID/User name, Email address, OpenID Connect (OIDC), Personal identification number (PIN))

For example, the planner is able to create, read, update, and delete (CRUD) the application initial data in the following range of the application settings:

Icon
Label
Scan and print settings
  Default value
  List of selectable items
  Metadata for generating a setting screen
Job settings
  Connection destination flow
  Job input means (Email, PM, Mobile, PC, NFC, MFP, Printer, Facsimile, Electronic white board, Third party's MFP, Third party's cloud service)

For example, the system administrator is able to create, read, update, and delete (CRUD) the application instance in the following range of the application settings:

Icon
Label
Scan and print settings
  Default value
  List of selectable items
  Authentication means (Tenant ID/User name, Email address, OIDC, PIN)

For example, the end user is able to apply personal settings to each application instance and use each application instance to which the persona settings is applied in the following range of the application settings:

Scan and print settings
  Default value (selectable from a list)

In addition, the end user defines the personal settings from a list of items of the application settings as illustrated in FIGS. 20A to 20C, for example. FIGS. 20A to 20C are a view illustrating the items and values of the application settings for scanning, that are selectable by the end user.

As described heretofore, in the information processing system 1 according to the present embodiment, the service provision system 10 manages the application initial data constituted by the combination of the application and the application setting. Further, in the service provision system 10, the standard package, the package dedicated to a specific industry, and/or the package dedicated to a specific task, are created in advance. This makes it easier for a sales representative to sell a solution to a customer. Accordingly, with the information processing system 1 according to the present embodiment, it is possible to improve efficiency in selling an application used in the image forming apparatus 20. Hereinafter, a description is given of another embodiment of the present disclosure. In the above-described embodiment, examples of the application initial data edit screen are illustrated in FIGS. 12 and 13. Further, an example of the application setting edit screen for the Scan to Storage application instance is illustrated in FIG. 19. In the present embodiment, a description is given of the examples of screens for a job print application. For example, the system configuration management site controller 30 causes the planner terminal 12 to display the application initial data edit screen as illustrated in FIGS. 21 and 22 to accept the instruction for registration of the application initial data from the planner.

FIGS. 21 and 22 are views, each illustrating another example of the application initial data edit screen. The application initial data edit screen illustrated in FIGS. 21 and 22 is an application initial data edit screen for the job print application. In FIG. 21, entry fields for the application initial data settings are illustrated. In FIG. 22, entry fields for the application job settings are illustrated.

Figure 23:
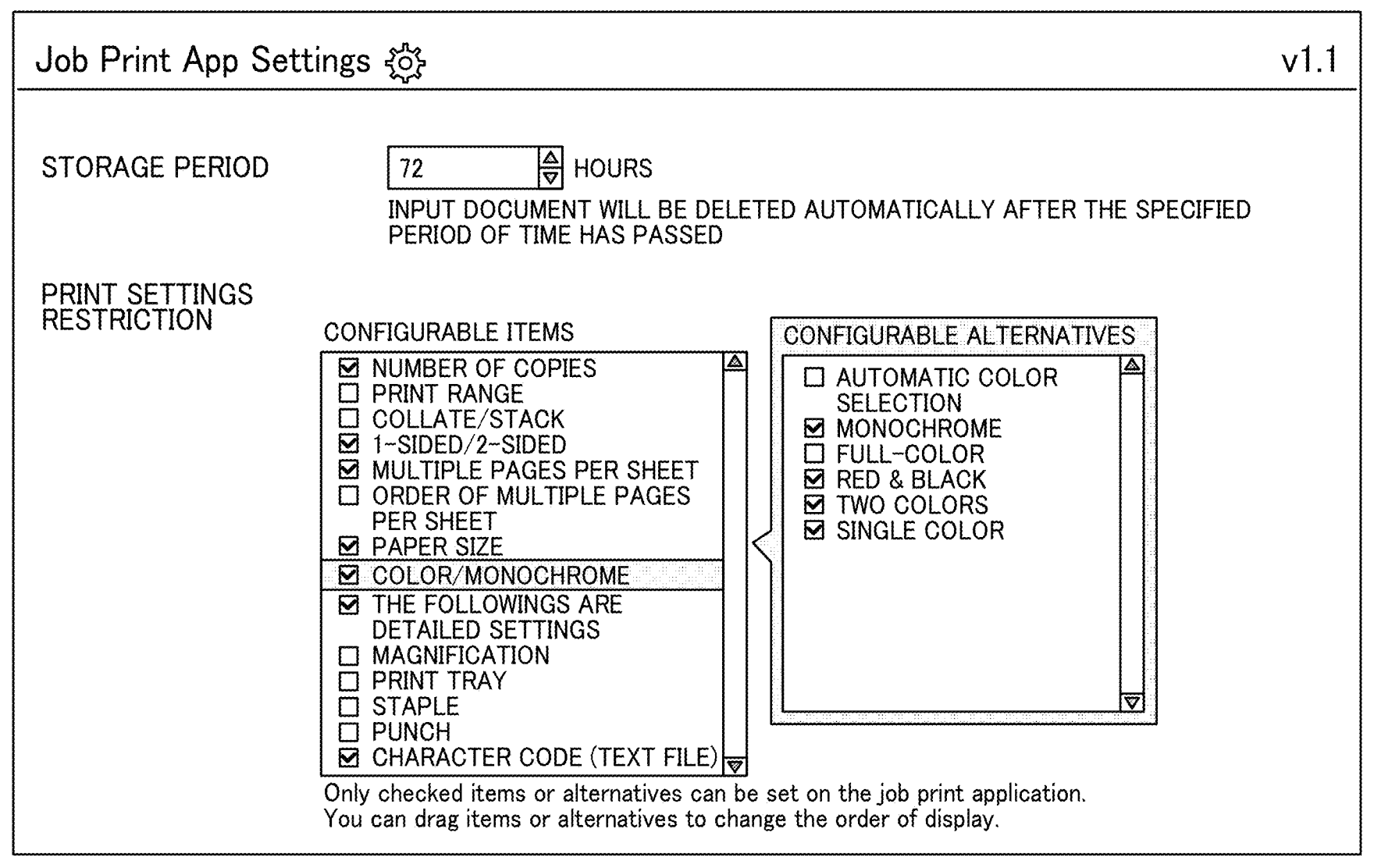

Further, the system management site controller 34 causes the system administrator terminal 16 to display the application setting edit screen as illustrated in FIG. 23 to accept an instruction from the system administrator for editing the application settings. FIG. 23 is a view illustrating another example of the application setting edit screen. FIG. 23 illustrates an example of the application setting edit screen in which a storage period of a job and a print settings restriction are edited. The system administrator sets alternatives that can be set on the job print application via the application setting edit screen as illustrated in FIG. 23.

Further, the system management site controller 34 causes the end user terminal 18 to display an application setting screen as illustrated in FIG. 24 to accept the application settings from the end user. FIG. 24 is a view illustrating an example of the application setting screen. The end user is able to define his/her own application settings in a range that is set to be selectable according to the setting value of the application instance of the tenant via the application setting screen of FIG. 24.

The information processing system 1 described in the above embodiments is just an example, and there may be various system configurations depending on applications or purposes. The image forming apparatus 20 is an example of an electronic device described in the appended claims. The service provision system 10 is an example of an information processing apparatus that manages one or more web applications that the electronic apparatus uses via a network.

According to an aspect of the present invention, efficiency is improved in selling a web application used in an electronic device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An information processing apparatus comprising:
   a memory configured to,
      store one or more application data, each application data including a set of a web application and settings of the web application, and
      store packages formed by selecting one or more of the application data; and
   processing circuitry configured to,
      install at least one package of the packages associated with an organization, to allow an image forming apparatus of the organization to use the web application included in the at least one package stored in the memory,
      receive from a terminal apparatus a request for settings of the web application,
      edit the settings of the web application, and
      cause the web application to execute a flow based on the settings of the web application to process image data for the image forming apparatus of the organization after a scanning of the image data or before a printing of the image data.

2. The information processing apparatus of claim 1, wherein the processing circuitry is further configured to,
   cause another terminal apparatus operated by another user to display a first screen that accepts, from the another user, a request for registration of the packages, and
   store, in the memory, the packages of the application data, based on the request for registration of the packages accepted via the first screen.

3. The information processing apparatus of claim 1, wherein the processing circuitry is further configured to,
   cause another terminal apparatus operated by another user to display a second screen that accepts, from the another user, a request for registration of the application data, and
   store the application data in the memory based on the request for registration of the application data accepted via the second screen.

4. The information processing apparatus of claim 1, wherein the processing circuitry is further configured to,
   cause another terminal apparatus operated by another user to display a third screen that accepts, from the another user, a request for customizing the at least one package stored in the memory, and
   customize the at least one package by editing the settings for the web application based on the request for customizing the at least one package accepted via the third screen.

5. The information processing apparatus of claim 1, wherein the processing circuitry is further configured to edit the settings of the web application based on a request for customizing the settings of the web application of the application data contained in the at least one package.

6. The information processing apparatus of claim 1, wherein the settings of the web application include a setting of a user interface of the web application and a setting of the flow of the web application.

7. A method of operating an information processing apparatus, the information processing apparatus including a memory, the method comprising:
   storing, in the memory, one or more application data, each application data including a set of a web application and settings of the web application;
   storing, in the memory, packages formed by selecting one or more of the application data;
   installing at least one package of the packages associated with an organization, to allow an image forming apparatus of the organization to use the web application included in the at least one package stored in the memory;
   receiving from a terminal apparatus a request for settings of the web application;
   editing the settings of the web application based on the request; and
   causing the web application to execute a flow based on the settings of the web application to process image data for the image forming apparatus of the organization after a scanning of the image data or before a printing of the image data.

8. The method of claim 7, wherein the method further comprises:
   causing another terminal apparatus operated by another user to display a first screen that accepts, from the another user, a request for registration of the packages; and
   storing, in the memory, the packages of the application data, based on the request for registration of the packages accepted via the first screen.

9. The method of claim 7, wherein the method further comprises:
   causing another terminal apparatus operated by another user to display a second screen that accepts, from the another user, a request for registration of the application data; and
   storing the application data in the memory based on the request for registration of the application data accepted via the second screen.

10. The method claim 7, wherein the method further comprises:
    causing another terminal apparatus operated by another user to display a third screen that accepts, from the another user, a request for customizing the at least one package stored in the memory; and
    customizing the at least one package by editing the settings for the web application based on the request for customizing the at least one package accepted via the third screen.

11. The method of claim 7, wherein the method further comprises:
    editing the settings of the web application based on a request for customizing the settings of the web application of the application data contained in the at least one package.

12. The method of claim 7, wherein the settings of the web application include a setting of a user interface of the web application and a setting of a flow of the web application.

13. A non-transitory computer-readable storage medium storing a computer-executable product that, when executed by processing circuitry of an information processing apparatus, causes the processing circuitry to,
    store, in a memory of the information processing apparatus, one or more application data, each application data including a set of a web application and settings of the web application;
    store, in the memory, packages formed by selecting one or more of the application data;
    install at least one package of the packages associated with an organization, to allow an image forming apparatus of the organization to use the web application included in the at least one package stored in the memory;
    receive from a terminal apparatus a request for settings of the web application;
    edit the settings of the web application based on the request; and
    cause the web application to execute a flow based on the settings of the web application to process image data for the image forming apparatus of the organization after a scanning of the image data or before a printing of the image data.

14. The non-transitory computer-readable storage medium of claim 13, wherein the computer-executable product, when executed, further causes the processing circuitry to,
    cause another terminal apparatus operated by another user to display a first screen that accepts, from the another user, a request for registration of the packages; and
    store, in the memory, the packages of the application data, based on the request for registration of the packages accepted via the first screen.

15. The non-transitory computer-readable storage medium of claim 13, wherein the computer-executable product, when executed, further causes the processing circuitry to,
    cause another terminal apparatus operated by another user to display a second screen that accepts, from the another user, a request for registration of the application data; and
    store the application data in the memory based on the request for registration of the application data accepted via the second screen.

16. The non-transitory computer-readable storage medium claim 13, wherein the computer-executable product, when executed, further causes the processing circuitry to,
    cause another terminal apparatus operated by another user to display a third screen that accepts, from the another user, a request for customizing the at least one package stored in the memory; and
    customize the at least one package by editing the settings for the web application based on the request for customizing the at least one package accepted via the third screen.

17. The non-transitory computer-readable storage medium of claim 13, wherein the computer-executable product, when executed, further causes the processing circuitry to,
    edit the settings of the web application based on a request for customizing the settings of the web application of the application data contained in the at least one package.

18. The non-transitory computer-readable storage medium of claim 13, wherein the settings of the web application include a setting of a user interface of the web application and a setting of the flow of the web application.

* * * * *